US006859252B2

United States Patent
Tsujimura et al.

(10) Patent No.: US 6,859,252 B2
(45) Date of Patent: Feb. 22, 2005

(54) ACTIVE MATRIX SUBSTRATE AND MANUFACTURING METHOD THEREOF

(75) Inventors: Takatoshi Tsujimura, Fujisawa (JP); Osamu Tokuhiro, Shiga-ken (JP); Kohichi Miwa, Yokohama (JP); Mitsuo Morooka, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/786,925

(22) Filed: Feb. 24, 2004

(65) Prior Publication Data

US 2004/0165121 A1 Aug. 26, 2004

Related U.S. Application Data

(62) Division of application No. 09/682,002, filed on Jul. 6, 2001, now Pat. No. 6,707,513.

(30) Foreign Application Priority Data

Jul. 10, 2000 (JP) ........................................ 2000-208593

(51) Int. Cl.$^7$ ........................ G02F 1/1368; H01L 21/00
(52) U.S. Cl. ........................... 349/187; 349/43; 349/47; 438/151
(58) Field of Search ............................ 349/43, 48, 47, 349/187, 46; 257/57, 59, 72; 438/30, 149, 151, 158, 161, 48

(56) References Cited

U.S. PATENT DOCUMENTS

| | | | |
|---|---|---|---|
| 5,478,766 A | * | 12/1995 | Park et al. .................... 438/158 |
| 5,731,856 A | | 3/1998 | Kim et al. |
| 5,777,702 A | | 7/1998 | Wakagi et al. |
| 6,222,600 B1 | | 4/2001 | Hirano |

FOREIGN PATENT DOCUMENTS

| | | |
|---|---|---|
| JP | 61-161764 | 7/1986 |
| JP | 61-188967 | 8/1986 |
| JP | 2873119 | 10/1991 |
| JP | 05-113580 | 5/1993 |
| JP | 08-201849 | 8/1996 |

* cited by examiner

Primary Examiner—Toan Ton
Assistant Examiner—Tai Duong
(74) Attorney, Agent, or Firm—Derek S. Jennings; David Aker

(57) ABSTRACT

An active matrix substrate includes a gate electrode, a gate insulating film, a semiconductor layer, a source electrode and a drain electrode, which are sequentially deposited on an insulating substrate. A transparent conductive layer is deposited on the source and drain electrodes so that the transparent conductive layer includes a portion deposited to be substantially the same pattern as those of the source and drain electrodes. The transparent conductive layer is connected to either the source electrode or the drain electrode to form a pixel electrode. A gate line is further included on which the gate insulating film is deposited. The gate line is to be connected to the gate electrode.

10 Claims, 8 Drawing Sheets

(a)

(b)

(c)

(d)

ACTIVE MATRIX SUBSTRATE AND MANUFACTURING METHOD THEREOF

This application is a divisional of application Ser. No. 09/682,002 filed on Jul. 6, 2001, now U.S. Pat. No. 6,707,513.

FIELD OF THE INVENTION

The present invention relates to an active matrix substrate, a display device, and a method of manufacturing the active matrix substrate. The present invention relates particularly to an active matrix substrate manufactured by a method in which a patterning step is omitted, and a display device incorporating the same therein.

BACKGROUND ART

In an active matrix type liquid crystal display device using an active matrix substrate, liquid crystal is sealed between an opposite substrate and a TFT array substrate in which a gate electrode (Y-electrode) and a data electrode (X-electrode) are arranged in a matrix fashion. The opposite substrate is arranged opposite to a TFT array substrate. The thin film transistor (TFT) is arranged in a cross point of the gate and data electrodes. A voltage applied to the liquid crystal is controlled by the thin film transistor. Thus, the liquid crystal display is enabled to display an image by using an electrical optical effect of the liquid crystal.

As a structure of the active matrix substrate in which a thin film transistor is formed, a top gate type (a positive stagger type) structure and a bottom gate type (a reverse stagger type) structure have been known. In this top gate type active matrix substrate, a light shielding film is first formed on an insulating substrate such as a glass substrate, and an insulating film formed of silicon oxide (SiOx), silicon nitride (SiNx) or the like is formed on the light shielding film. A source electrode and a drain electrode that are metallic electrodes are formed on the insulating film with a channel gap therebetween, and a pixel electrode formed of indium tin oxide (hereinafter referred to as ITO) is formed so as to be connected to either the drain electrode or the source electrode. Furthermore, an amorphous silicon film (hereinafter referred to as an a-Si film) as a semiconductor film which covers the source electrode and the drain electrode, a gate insulating film formed of SiOx, SiNx or the like, and a gate electrode formed of aluminum (Al) or the like are formed on the pixel electrode in this order. A protection film (a passivation film) formed of SiNx or the like is formed on the gate electrode.

On the other hand, in the bottom gate type active matrix substrate, at first, a gate electrode is formed on an insulating substrate such as a glass substrate, and a gate insulating film and an a-Si film are formed on the gate electrode. Furthermore, a pixel electrode formed of ITO is formed on the insulating substrate. Thereafter, a source electrode and a drain electrode are formed on the a-Si film with a channel gap therebetween. At this time, either the source electrode or the drain electrode is connected to the pixel electrode.

As the steps for manufacturing these active matrix substrates, so called a 7 PEP (Photo Engraving Process) structure generally exists. For example, in the 7 PEP structure for manufacturing a top gate type TFT, a light shielding film is formed in a first PEP, and then a source electrode and a drain electrode, which are formed of ITO, are formed by patterning in a second PEP. Thereafter, a pixel electrode formed of ITO is formed in a third PEP. In a fourth PEP, an a-Si film and a first gate insulating film are formed by a CVD (Chemical Vapor Deposition), and patterned to an island-like pattern. Subsequently, a second insulating film is formed in a fifth PEP, and an Al film as a gate electrode is formed by sputtering and patterned in a sixth PEP. Finally, a protection film is formed in a seventh PEP.

Furthermore, in the seventh PEP for manufacturing a bottom gate type TFT, a gate electrode is formed on an insulating film by etching in the first PEP, and then a gate insulating, an a-Si film and an etching protection film formed of SiNx or the like are formed in the second PEP. In the third PEP, the a-Si film is patterned, and an a-Si island is formed. Subsequently, a pixel electrode formed of ITO is formed in the fourth PEP. Thereafter, perforation is performed so as to expose the gate electrode in the fifth PEP, and then a source electrode and a drain electrode are formed in the sixth PEP. Finally, the source electrode and the drain electrode are covered with a protection film formed of SiNx or the like in the seventh PEP, thus completing a series of steps.

However, the 7 PEPs structure is undesirable in a point that the 7 PEPs structure increases the number of complicated steps in addition to the number of photo masks, so that a yield ratio of the manufacturing steps is remarkably lowered, resulting in increase cost of the products. To solve such problems, the applicant of this application has proposed a technology relating to this manufacturing process as disclosed in Japanese Patent Application Numbers Hei 11(1998)-214603, Hei 12(2000)-4301 and Hei 12(2000)-28357. A 4 PEPs technology is adopted, in which a gate line undergoes over-etching in forming a gate electrode of a top gate type TFT, and a SiNx film and an a-Si layer are etched using a mask for forming the gate electrode. Thereby, conducting island cutting. Specifically, in the 4 PEP technology, the gate electrode, the gate insulating film and the a-Si film are sequentially etched by a single patterning step using a gate electrode plating pattern as a mask. The 4 PEPs technology has advantages, in that the manufacturing process steps can be reduced.

The PEP can be reduced by performing the island cutting process using the mask for forming the gate electrode. Resulting in an increased retention rate for the liquid crystal. More specifically, if dissolution of metal ions into the liquid crystal is reduced, and if portions of a data wiring and a gate wiring, which are exposed to the liquid crystal, can be reduced, the retention rate of the liquid crystal can be greatly increased. Furthermore, if adhesion of whiskers, dusts and the like to the liquid crystal can be reduced, it is possible to reduce the occurrence of a short-circuiting fault. Furthermore, if corrosion of a lead-out wiring can be reduced, a yield rate and a span in which products have reliability can be significantly increased.

Japanese Patent No. 2873119 discloses a technology in which patterning of an i-type semiconductor layer is made unnecessary. An $n^+$ type semiconductor layer, a source electrode and a drain electrode are simultaneously patterned, thus reducing the number of photo masks used in patterning them. However, the technology disclosed in '119 results in a large number of layers, and etching processes becomes troublesome, leading to a low yield rate. Moreover, since the gate electrode cannot withstand etching of the gate insulating film, an ITO film is formed thereon. However, this further requires a further step of forming the ITO film, and it is impossible to achieve a satisfactory simplified manufacturing process.

SUMMARY OF THE INVENTION

The present invention solves the above-described technological problems. A feature of the present invention is to increase a yield rate in manufacturing an active matrix substrate without increasing the number of patterning process steps, by covering a wiring with a gate insulating film and an ITO film, thus improving reliability.

Another feature of the present invention is to solve the above-described problems by performing the patterning of a gate insulating film, an upper electrode and a pixel electrode in two PEPs, thus decreasing the number of patterning steps.

Still another feature of the present invention provides an active matrix substrate comprising a source electrode and a drain electrode which are disposed on an insulating substrate and apart from each other, a semiconductor layer deposited on the source electrode and the drain electrode, a gate insulating film deposited on the semiconductor layer, a gate electrode deposited on the gate insulating film, a transparent conductive layer having first and second portions, the first portion being deposited on the gate electrode to have substantially the same pattern as that of the gate electrode, and the second portion includes a portion being deposited on a part of either the source electrode or the drain electrode.

Yet another aspect of the present invention is an active matrix substrate comprising a gate electrode, a gate insulating film, a semiconductor layer, a source electrode and a drain electrode, which are sequentially deposited on an insulating substrate, a transparent conductive layer deposited on the source and drain electrodes so that the transparent conductive layer includes a portion deposited to be the substantially same pattern as those of the source and drain electrodes, the transparent conductive layer being connected to either the source electrode or the drain electrode to form a pixel electrode, and a gate line on which the gate insulating film is deposited, the gate line being connected to the gate electrode.

Furthermore, the active matrix substrate of the present invention further comprises a data line connected to either the source electrode or the drain electrode, wherein a transparent conductive layer is constituted so as to include a portion which is deposited on the data line to be the substantially same pattern as that of the data line. According to such a construction, even when a bottom gate structure is adopted, an upper electrode and wirings are never exposed except for the patterning side portion, and a fault of short-circuiting can be prevented. Moreover, corrosion and the like of a lead-out wiring can be reduced.

An active matrix substrate of the present invention comprises a gate electrode deposited on an insulating substrate, a gate insulating film deposited on the gate electrode, a semiconductor layer deposited on the gate insulating film, a source electrode and a drain electrode deposited on the semiconductor layer, and an ITO film deposited on the source and drain electrodes, the ITO film including portions deposited in substantially the same pattern as that of each of the source and drain electrodes.

On the other hand, a display device according to the present invention comprises a thin film transistor structure formed on an insulating substrate, a pixel electrode formed to be connected to either a source electrode or a drain electrode of the thin film transistor structure, a data line formed to be connected to either the source electrode or the drain electrode of the thin film transistor structure, and a gate line formed to be connected to a gate electrode of the thin film transistor structure, wherein an upper surface of an upper electrode among the source, drain and gate electrodes of the thin film transistor is covered with ITO film and an upper surface of either the data line or the gate line is covered with a gate insulating film.

Various other objects, features, and attendant advantages of the present invention will become more fully appreciated as the same becomes better understood when considered in conjunction with the accompanying drawings, in which like reference characters designate the same or similar parts throughout the several views.

DETAILED DESCRIPTION

Figure 1:
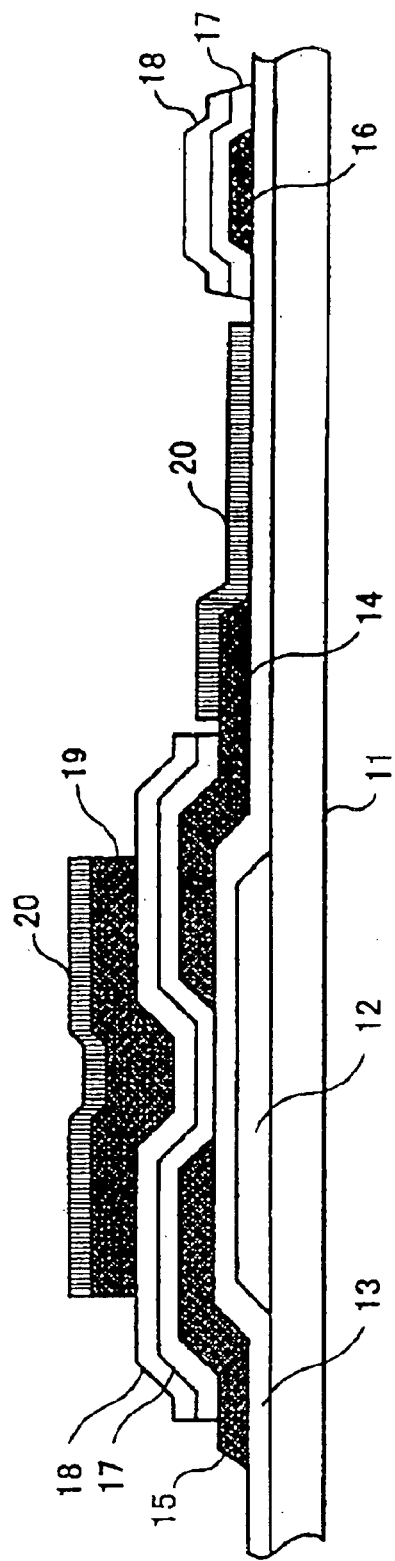
FIG. 1 is a sectional view showing a top gate type thin film transistor (TFT) structure as an active matrix substrate in an embodiment of the present invention.

Accordingly, the present invention provides a method for forming a TFT structure which is characterized in that the number of the process steps is significantly reduced while preventing a metal film structure forming an upper electrode, a wiring portion and the like of a TFT structure from being exposed to liquid crystal and the like.

The state represented by the words "substantially the same pattern" used here realized in such manner that the transparent conductive layer and the gate electrode are patterned in the same patterning step and then the gate electrode is etched by another step such as a dipping step (for example, the gate electrode is dipped in a solution which etches the gate electrode without etching the transparent conductive layer). In such case, the patterns of the transparent conductive layer and the gate electrode will be substantially equal to each other relative to the patterning side surface. The same is true for processings to be performed later.

The display device of the present invention further comprises a liquid crystal layer filled by the use of the insulating substrate, wherein surfaces of the upper electrode, the data line and the gate line, which comes in contact with the liquid crystal layer, are covered with the ITO film or the gate insulating film. Accordingly, a region where a wiring is exposed to the liquid crystal layer can be reduced, and it is possible to reduce deterioration of a retention rate of the liquid crystal owing to dissolution of metal ions to the liquid crystal layer.

The present invention is also providing a method for manufacturing an active matrix substrate in which a source electrode, a drain electrode, a semiconductor layer, a gate insulating film and a gate electrode are sequentially deposited on an insulating substrate directly or indirectly, which comprises the steps of patterning a gate metal deposited on the gate insulating film by using a resist mask, patterning the gate insulating film and the semiconductor layer by using the patterned gate metal as a mask, patterning the ITO film by using a resist mask after forming an ITO film on the gate electrode, and patterning the gate electrode using the patterned ITO film as a mask.

Here, the step of patterning the ITO film comprises a step of patterning the ITO film in consideration of a pattern of the gate electrode to be formed as well as forming a pattern of a pixel electrode. Accordingly, the method of manufacturing an active matrix substrate is preferable in that any further patterning step can be omitted and an exposed portion of the gate electrode can be reduced.

Furthermore, the step of patterning the ITO film is for patterning the ITO film in consideration of a pattern of the gate line to be formed, which is connected to the gate electrode. Accordingly, an exposed portion of the gate line that is a wiring can be reduced desirably.

And another aspect of the present invention relating to the method of manufacturing the active matrix substrate is providing the method of manufacturing the active matrix substrate comprising the steps of forming a pattern of a gate electrode on an insulating substrate, sequentially depositing a gate insulating film and a semiconductor layer on the gate electrode and then forming a metal film, depositing an ITO film in consideration of a pattern of the formed metal film to be patterned and in consideration of a pattern of a pixel electrode, and patterning the metal film using the deposited ITO film as a mask, thus forming a source electrode and a drain electrode.

Here, the method of manufacturing the active matrix substrate further comprises a step of forming a protection film to cover the ITO film and the source and drain electrodes on which the ITO film is deposited and patterning the semiconductor layer using the protection film. Accordingly, it is possible to perform patternings by effective use of the steps, and reducing the manufacturing steps and a reduction in cost can be desirably achieved.

Furthermore, a pattern of a data line is formed using the ITO film as a mask in the same step as that for forming the source and drain electrodes. Accordingly, the data line is never exposed, and a fault of short-circuiting due to whiskers and dusts and the like can be prevented from happening.

Furthermore, the step of forming the metal film forms the metal film in the same pattern as that, with which the gate insulating film is patterned. Accordingly, the manufacturing processes can be further simplified.

Hereupon, if the ITO film is formed in the same step as that for forming an ITO film constituting the pixel electrode, the present invention is preferable in a point that a patterning step can be omitted, thus the manufacturing steps is reduced.

Hereinafter, the present invention will be described based on an embodiment shown in the attached drawings in detail.

FIG. 1 is a drawing showing a thin film transistor (TFT) structure in this embodiment as an active matrix substrate. In FIG. 1, a top gate type TFT is exemplified, and the TFT is fabricated by a manufacturing method to be described later while significantly reducing the manufacturing process steps. In the top gate type TFT in this embodiment, a light shield film 12 formed of Mo alloy such as Mo, MoCr or the like is formed on an insulating substrate 11 formed of non-alkali fiber glass, quartz or the like, an insulating film 13 as an undercoat layer formed of silicon oxide (SiOx), silicon nitride (SiNx) and the like is formed to cover the light shield film 12. Metal films formed of molybdenum-tungsten (Mo—W) alloy using Mo, Ti, Ta, Cr, Nb, W, Ag or the like are deposited on the insulating film, and patterned to form a source electrode 14, a drain electrode 15 and a data line 16.

An a-Si film 17 is formed on the source electrode 14, the drain electrode 15 and the data line 16, which are formed by patterning. A gate insulating film 18 composed of a first silicon nitride film (a first SiNx film) and a second silicon nitride film (a second SiNx film), which serves as a passivation film of a TFT channel, is formed on the a-Si film 17. A gate electrode 19 formed of a metal such as Cr, Al or the like is formed on the gate insulating film 18 constituting an a-Si island. Furthermore, in this embodiment, in order to reduce the manufacturing process steps, the a-Si film 17, and the gate insulating film 18 located under the gate electrode 19 are etched at a time by dry etching using the gate metal as a mask, which is the gate electrode 19 before patterning, as described later.

An indium tin oxide (ITO) film 20 that is a transparent conductive film used for a pixel electrode is formed on the source electrode 14 and the insulating substrate 11. This ITO film 20 is connected to the source electrode 14 to be used as the pixel electrode, and moreover the ITO film 20 is formed also on the gate electrode 19 in this embodiment. Specifically, in this embodiment, the ITO film 20 is patterned so as to leave the ITO film 20 at a position where the gate electrode 19 and a gate line (not shown) are to be formed by patterning the gate metal as well as at a position where the pixel electrode is to be formed. The gate electrode 19 and the gate line are formed by patterning using the ITO film 20 formed on the gate electrode and the gate line as a mask. As a result, the gate electrode 19 and the gate line are in a state where the gate electrode 19 and the gate line are covered with the ITO film 20. Furthermore, the source electrode 14 is also covered with the ITO film 20. As described above, since the data line 16 is covered with the gate insulating film 18 and the gate line is covered with the ITO film 20 in this embodiment, it is possible to prevent deterioration of a retention rate of the liquid crystal, a fault of short-circuiting between the gate line and the data line 16 and corrosion of a lead-out wiring, i.e. a wiring between array and pads. When aluminum is used as the gate electrode 19, polycrystalline ITO cannot be used as the ITO film 20. Consequently, amorphous ITO or IZO is used as the ITO film 20 in this embodiment. The amorphous ITO can be converted to polycrystalline ITO by annealing the amorphous ITO afterward.

FIGS. 2(a) to 2(d) are drawings for explaining manufacturing process steps of the top gate type thin film transistor (TFT) in this embodiment.

Figure 2:
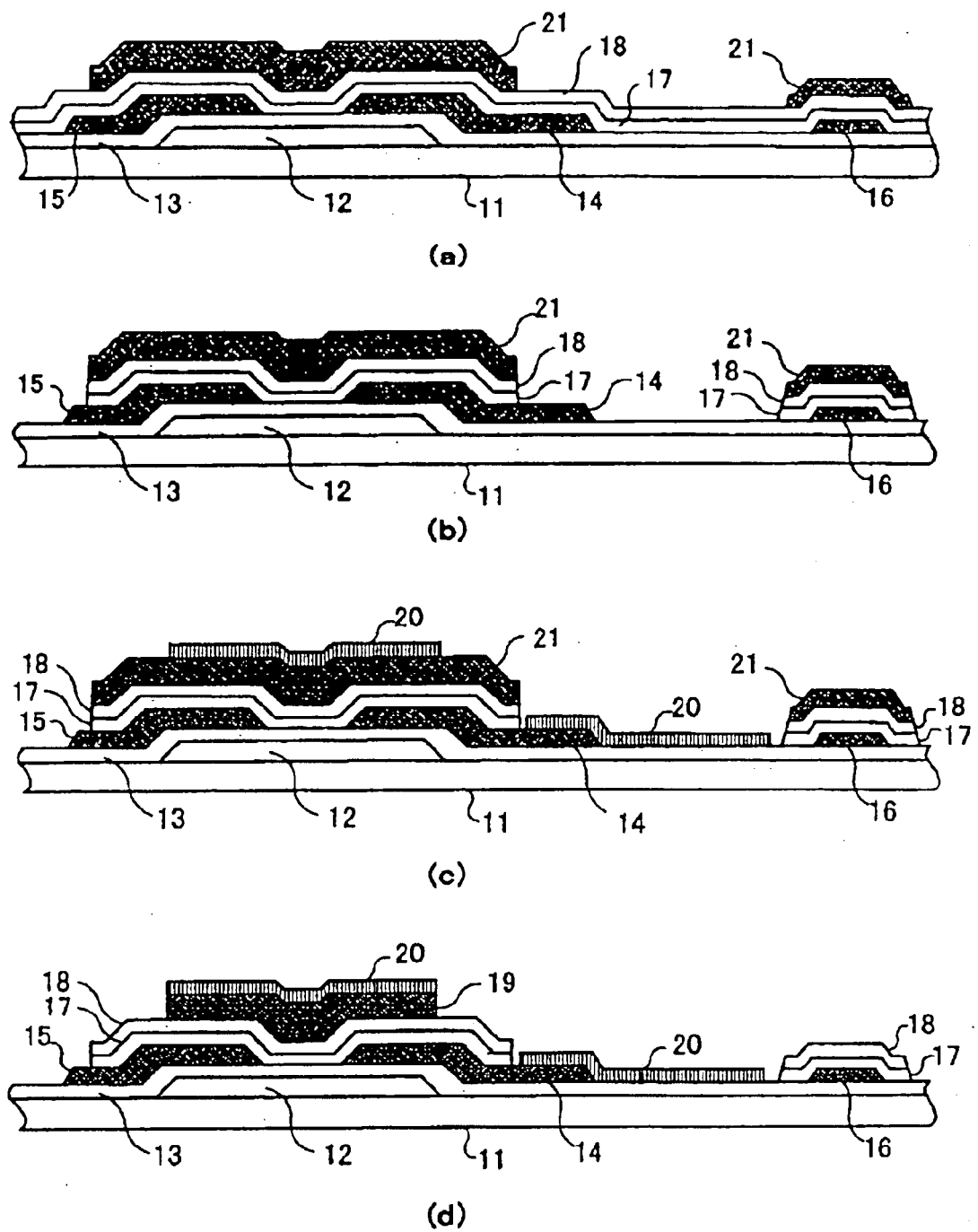
FIGS. 2(a) to 2(d) show sectional views for explaining manufacturing steps in a top gate type thin film transistor (TFT) in the first embodiment.

As shown in FIG. 2(a), at first, the insulating substrate 11 such as a glass substrate is cleaned using mechanical cleaning such as brush cleaning (or scrub cleaning) and chemical cleaning by acid, organic solution or the like, and then Mo alloy for the light shield is formed to a predetermined film pressure using magnetron sputtering. The light shield film 12 is formed using a photolithography technique for performing photo etching for the Mo alloy using photo resist (not shown) as a mask. Thus, the first PEP is finished. Subsequently, the insulating film 13 formed of silicon oxide (SiOx) film as an interlayer insulating film, which offers a strong adhesion, is formed by a plasma CVD method. Thereafter, Mo alloys for forming the source and drain electrodes and the data bus line are sequentially formed by magnetron sputtering, and the data bus line and the source and drain electrodes are patterned by a photolithography technique, and thus the source electrode 14, the drain electrode 15 and the data line 16 are formed. Thus, the second PEP is finished. Furthermore, the a-Si film 17 as a semiconductor material is formed by a plasma CVD method, and thereafter the first SiNx film and the second SiNx film are sequentially formed by a plasma CVD method so as to form the gate insulating film 18. Thereafter, etching for the a-Si film 17 and the gate insulating film 18 is omitted, and the gate metal 21 formed of Al or the like, which is used for the gate electrode 19 and the gate line, is formed by magnetron sputtering. The gate metal 21 is patterned to a shape in consideration of etching of the a-Si film 17 and the gate insulating film 18, and thus the gate metal 21 is formed on a portion corresponding to the a-Si island that is the TFT channel and on the data line 16.

Subsequently, as shown in FIG. 2(b), as the third PEP, the a-Si film 17 and the gate insulating film 18 are etched. In this embodiment, the a-Si film 17 and the gate insulating film 18 are etched at a time using resist on the gate electrode 21 as a mask. As a result, since the a-Si film 17 and the gate insulating film 18 can be etched continuously by one lithography step, the manufacturing process steps can be greatly reduced.

Next, as shown in FIG. 2(c), as the fourth PEP, after the amorphous ITO film is formed, the ITO film 20 is formed by the use of a resist mask in etching solution containing comparative mild acid such as oxalic acid. Hereupon, strong acid such as chloric acid and nitric acid is not used, and the relatively mild acid is used, so that damage by the strong acid in etching, for example, corrosion of the gate electrode 19 formed of aluminum, can be prevented. Furthermore, the ITO film 20 forms the pixel electrode and is used when the gate metal 21 and the gate line are patterned in the subsequent step. The ITO film 20 formed in this step is patterned to a shape in consideration of shapes of the pixel electrode, the gate electrode 19 and the gate line.

Finally, as shown in FIG. 2(d), the gate metal 21 and the gate line (not shown) are patterned. Specifically, in this embodiment, the gate metal 21 is patterned using the ITO film 20 as a mask, and thus the gate electrode 19 and the gate line are formed.

As described above, in this embodiment, the patterning of the gate insulating film 18, the patterning of the gate electrode 19 as an upper electrode and the gate line and the patterning of the pixel electrode can be carried out in two PEPs, and thus the number of patterning processes can be significantly reduced. Furthermore, by the steps of this embodiment, the ITO film 20 that is oxide is formed on the gate electrode 19, which is an upper electrode, and the gate line. The data line 16 is covered with the gate insulating film 18. As a result, the wirings are never exposed to the liquid crystal, and a retention rate of the liquid crystal is not going lower. In addition, a fault of short-circuiting due to whiskers, dusts and the like and corrosion of the wirings can be avoided.

In the above embodiment, the active matrix substrate was described using the top gate type TFT as an example. In another embodiment, a bottom gate type TFT is described as the active matrix substrate.

Note that in this embodiment the same reference numerals are used for the same constituent components as those in the embodiment 1, and detailed descriptions for them are not described here.

Figure 3:
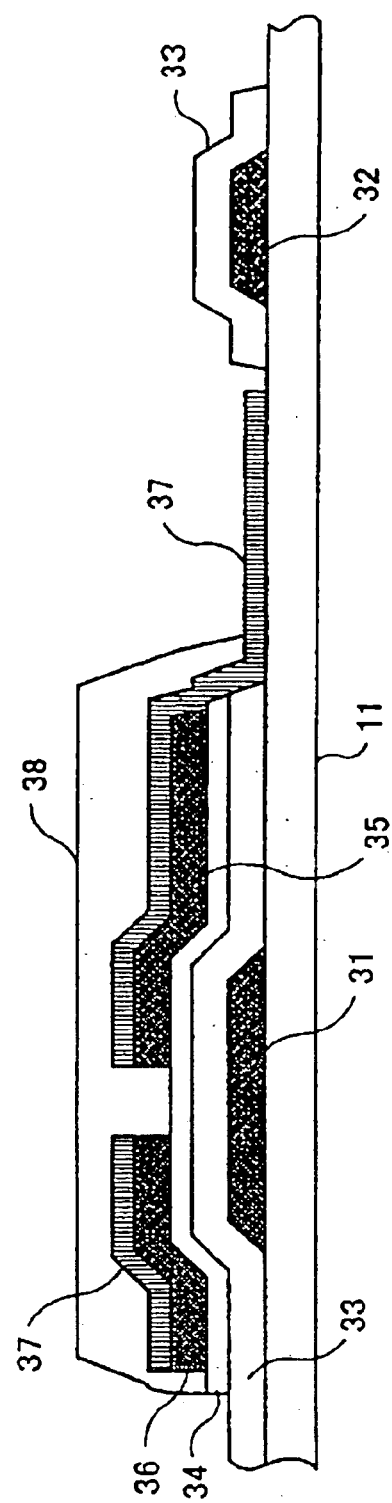
FIG. 3 shows a sectional view for explaining a bottom gate type TFT structure as the active matrix substrate in a second embodiment.

FIG. 3 is a drawing for explaining a bottom gate type TFT structure as the active matrix substrate in the second embodiment. In the bottom gate type TFT structure in this embodiment, a gate electrode 31 and a gate line 32, which are formed of Al or the like, are provided on an insulating substrate 11 by sputtering and patterning. A gate insulating film 33 formed of an insulating film such as $Ta_2O_5$ by sputtering or $SiO_2$ and SiNx by a plasma CVD is formed on the gate electrode 31 and the gate line 32. In a TFT channel portion constituting an a-Si island, an a-Si film 34 forming a semiconductor layer is formed on the gate insulating film 33, and a source electrode 35 and a drain electrode 36, which are formed of a metal film such as aluminum or the like, are formed on the a-Si film 34 above the gate electrode 31.

Furthermore, in this embodiment, an ITO film 37, which is a transparent conductive film used for a pixel electrode, is formed on the source electrode 35, drain electrodes 36 and a data line (not shown). In this embodiment, the source and drain electrodes 35 and 36, which are upper electrodes, and a data line are patterned by using the ITO film 37 as a mask. In addition, a protection film 38 formed of, for example, a silicon nitride film is formed on the a-Si island portion and the data line portion other than the pixel electrode portion. The a-Si film 34 is patterned by using the protection film 38.

Figure 6:
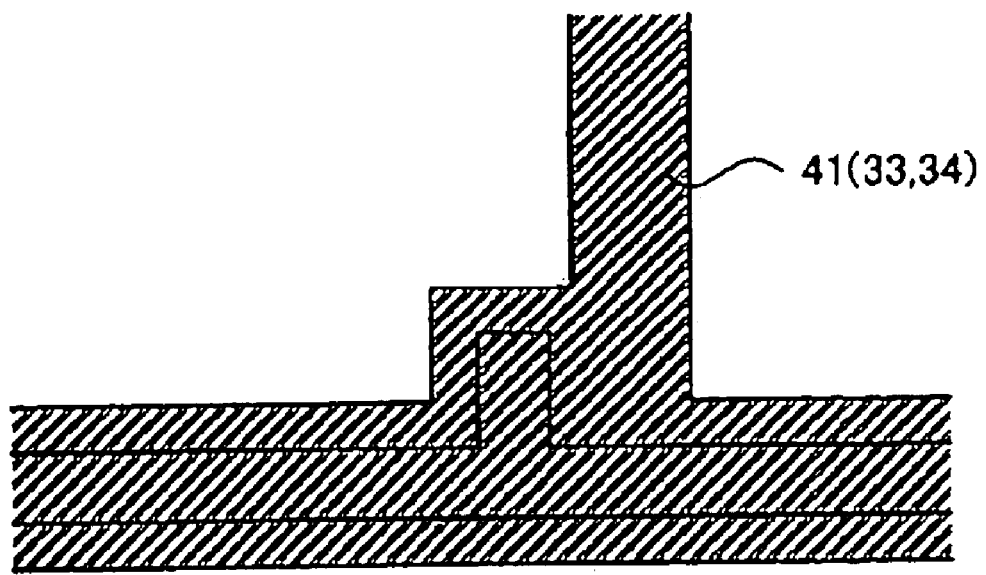
FIG. 6 is a plan view showing a second PEP.
Figure 7:
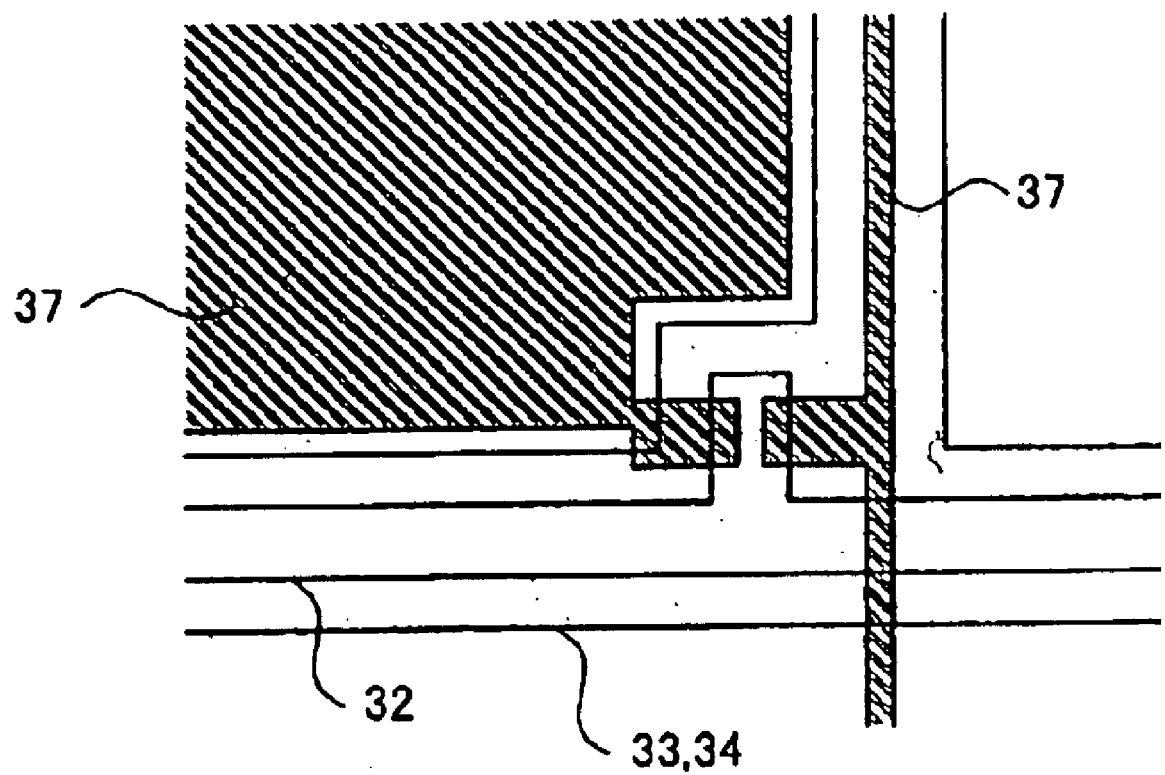
FIG. 7 is a plan view showing a third PEP.
Figure 8:
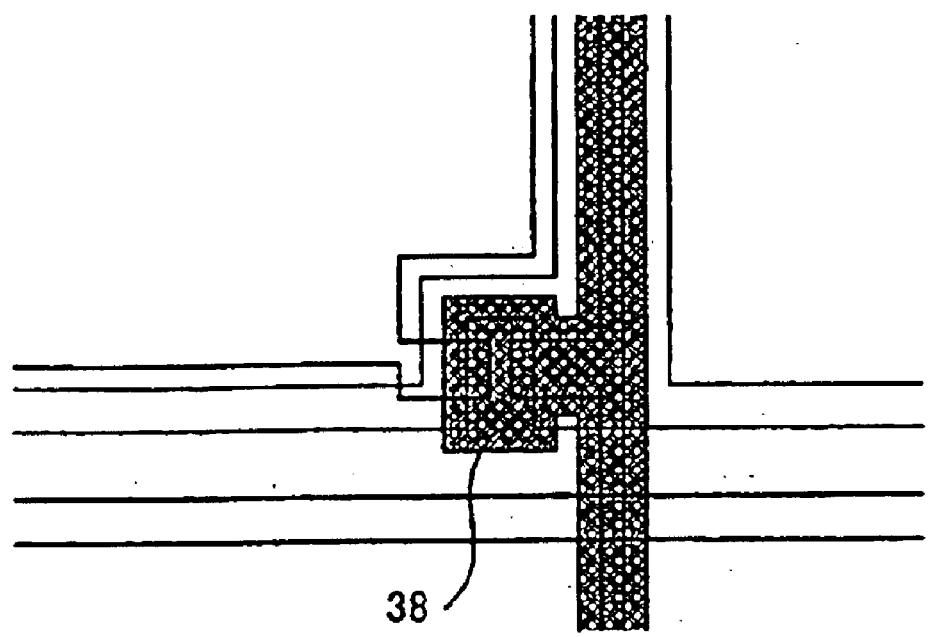
FIG. 8 is a plan view showing a fourth PEP.

FIGS. 4(a) to 4(d) are drawings for explanation for manufacturing steps in the bottom gate type TFT of this embodiment. FIGS. 5 to 8 are plan views for explanation for the manufacturing steps of the bottom gate type TFT structure corresponding to FIGS. 4(a) to 4(d). FIG. 5 is the plan view for explaining the first PEP, and FIG. 6 is the plan view for explaining the second PEP. FIG. 7 is a plan view for explaining the third PEP, and FIG. 8 is a plan view for explaining the fourth PEP.

Figure 4:
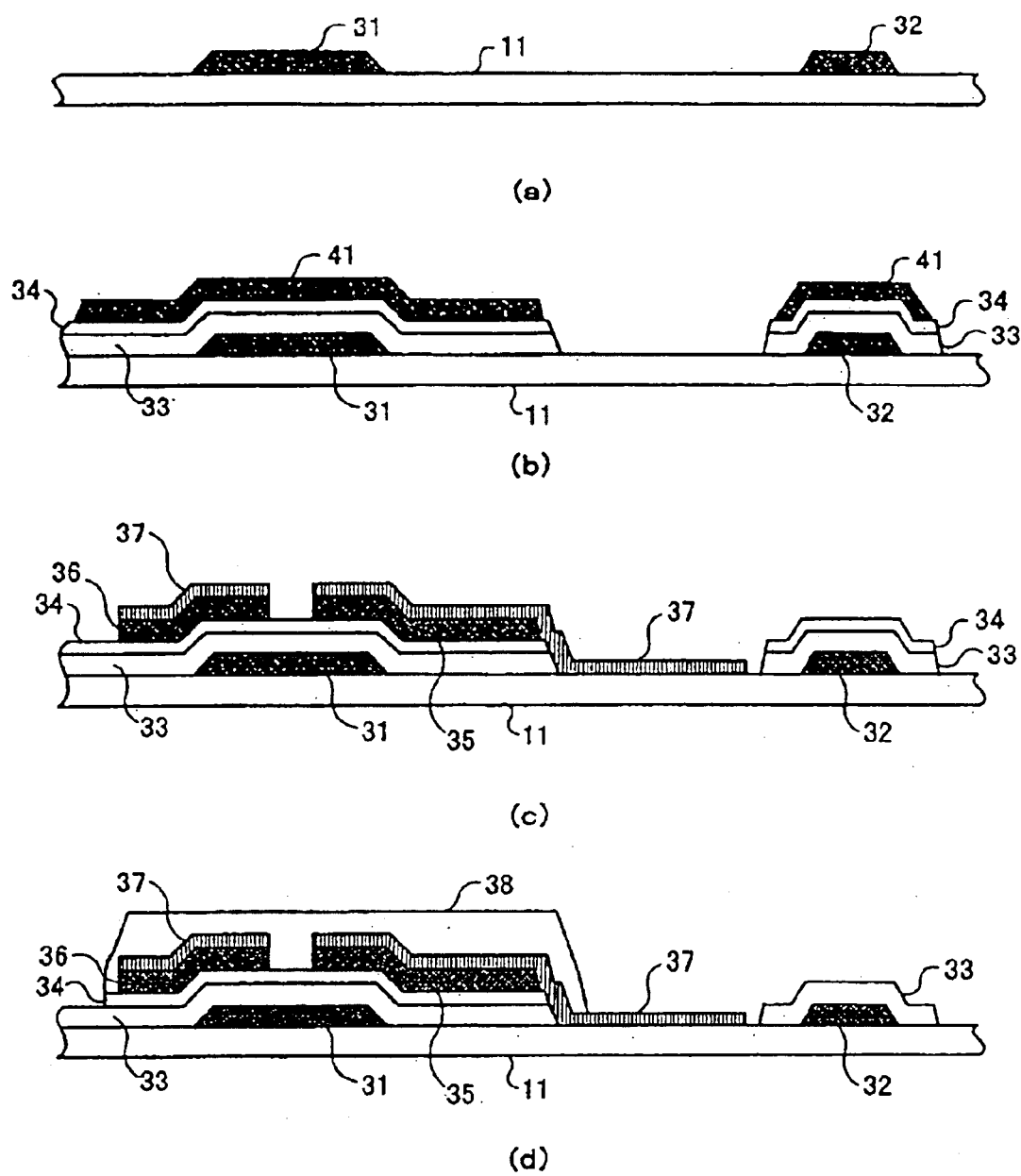
FIGS. 4(a) to 4(d) show sectional views for explaining manufacturing steps in a bottom gate type TFT in the second embodiment.
Figure 5:
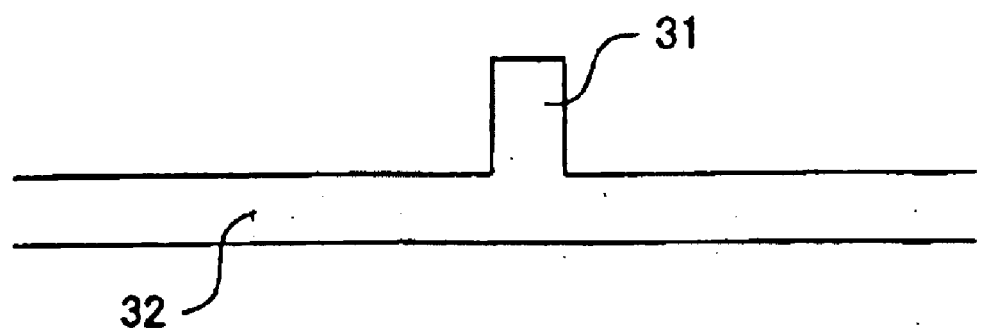
FIG. 5 is a plan view showing a first PEP.

As shown in FIGS. 4(a) and 5, as the first PEP, the gate electrode 31 and the gate line 32 made of aluminum or the like are formed on the cleaned insulating substrate 11 by patterning.

Next, as shown in FIGS. 4(b) and 6, as the second PEP, the gate insulating film 33 and the a-Si film 34 are deposited on the gate electrode 31 and the gate line 32 formed in the first PEP, and then an Al pattern 41 for forming the source and drain electrodes, which are upper electrodes, and the data line is formed on the gate insulating film 33 and the a-Si film 34. This Al pattern 41 is patterned in a same pattern as that of the gate insulating film 33.

Thereafter, as shown in FIGS. 4(c) and 7, as the third PEP, an amorphous ITO film that is a transparent conductive film is formed, and then is etched by etching solution containing relatively mild acid such as oxalic acid using a resist mask. Thus, the ITO film 37 is formed. This ITO film 37 constitutes the pixel electrode for display, which is a pixel. In addition, in this embodiment, the ITO film 37 is provided at positions where the ITO film 37 covers the source and drain electrodes 35 and 36 and where the ITO film 37 covers the data line. Furthermore, when the ITO film 37 is formed by the resist mask, the Al pattern 41 which is not covered with the ITO film 37 is patterned. The source and drain electrodes 35 and 36 that are the upper electrodes are formed by this patterning, and an unnecessary portion of the Al pattern 41 on the gate line 32 is removed. As the result of this step, a structure that the ITO film 37 overlaps the upper electrodes and extends so as to constitute the pixel electrode is obtained.

Finally, as shown in FIGS. 4(d) and 8, as the fourth PEP, the protection film 38 made of a silicon nitride film is formed. A TFT channel portion which constitutes the a-Si island is protected by the protection film 38, and also the data line portion is protected by the protection film 38. Since the data line portion is already protected by the ITO film 37, the protection film 38 is not always required to be provided on the data line portion. Furthermore, the a-Si film 34 is patterned by the protection film 38, and an unnecessary portion of the a-Si film 34 in the TFT channel portion is removed. At the same time, the a-Si film 34 on the gate line 32 is also removed. Specifically, in this embodiment, the pattern of the protection film 38 is formed in consideration of the pattern of the a-Si film 34 after patterning, and the a-Si film 34 is patterned by using the pattern of the protection film 38. In such manner as described above, the unnecessary portion of the a-Si film 34 in the TFT channel portion and the portion of the a-Si film 34 on the gate line 32 are simultaneously removed so as to leave the protection film 38, whereby it is possible to effectively utilize the respective steps, and the number of manufacturing steps can be greatly reduced. The processings pass through a series of manufacturing steps, whereby the manufacturing steps of the active matrix substrate are finished.

As described above, according to the structure and manufacturing method of the second embodiment, the source and drain electrodes 35 and 36 that are upper electrodes and the data line are patterned by using of the ITO film 37, whereby the patterning processes can be greatly omitted. Furthermore, the source and drain electrodes that are the upper electrodes are covered with the ITO film 37, and the gate line 32 is covered with the gate insulating film 33. Accordingly, the wirings are never exposed to the liquid crystal, and it is possible to prevent deterioration of a retention rate owing to the exposure of the wirings to the liquid crystal. Corrosion of the lead-out wiring can be prevented, and moreover a fault in short-circuiting can be prevented.

As described above, according to the present invention, the corrosion and the like of the lead-out wiring can be reduced by covering the wiring with the gate insulating film and the ITO film without increasing the number of the patterning processes. Furthermore, it is possible to increase the yield in manufacturing the active matrix substrate, and increase a reliability of the active matrix substrate.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims.

What is claimed is:

1. A method for manufacturing an active matrix substrate in which a source electrode, a drain electrode, a semiconductor layer, a gate insulating film and a gate electrode are sequentially deposited on an insulating substrate directly or indirectly, comprising the steps of:
   patterning a gate metal deposited on said gate insulating film by the use of a resist mask;
   patterning said gate insulating film and said semiconductor layer by using said patterned gate metal as a mask;
   forming an ITO film and patterning the ITO film by using a resist mask; and
   patterning said gate electrode by using said patterned ITO film as a mask.

2. The method according to claim 1, wherein the step of patterning said ITO film includes a step of patterning said ITO film in consideration of a pattern of said gate electrode as well as forming a pattern of a pixel electrode.

3. The display device according to claim 2, wherein the step of forming said ITO film is formed in the same step of forming an ITO film constituting said pixel electrode.

4. The method according to claim 2, wherein the step of patterning said ITO film includes a step for patterning said ITO film in consideration of a pattern of a gate line connected to said gate electrode.

5. A method of manufacturing an active matrix substrate comprising the steps of:
   forming a pattern of a gate electrode on an insulating substrate;
   sequentially depositing a gate insulating film and a semiconductor layer on said gate electrode and then forming a metal film;
   depositing an ITO film in consideration of a pattern of said metal film to be patterned and in consideration of a pattern of a pixel electrode; and
   patterning said metal film by using said ITO film as a mask thus forming a source electrode and a drain electrode; and
   providing a protection film on said source and drain electrodes to interpose the ITO film therebetween, and patterning said semiconductor layer by using said protection film.

6. The method according to claim 5, further comprising the step of:
   forming a pattern of a data line by using said ITO film as a mask in the step of forming said source electrode and said drain electrode.

7. The method according to claim 5, wherein the step of forming said metal film is for forming said metal film in the same pattern as that of the patterned gate insulating film.

8. A method of manufacturing an active matrix substrate comprising the steps of:
   forming a pattern of a gate electrode on an insulating substrate;
   sequentially depositing a gate insulating film and a semiconductor layer on said gate electrode and then forming a metal film;
   depositing an ITO film in consideration of a pattern of said metal film to be patterned and in consideration of a pattern of a pixel electrode; and
   patterning said metal film by using said ITO film as a mask thus forming a source electrode and a drain electrode;
   wherein the step of forming said metal film is for forming said metal film in the same pattern as that of the patterned gate insulating film.

9. The method according to claim 8, further comprising the step of:
   forming a pattern of a data line by using said ITO film as a mask in the step of forming said source electrode and said drain electrode.

10. The method according to claim 9, further comprising the step of:
    providing a protection film on said source and drain electrodes to interpose the ITO film therebetween, and patterning said semiconductor layer by using said protection film.

* * * * *